US010879831B1

(12) United States Patent
Nagel et al.

(10) Patent No.: US 10,879,831 B1
(45) Date of Patent: Dec. 29, 2020

(54) METHOD AND SYSTEM FOR REAL-TIME ANOMALY DETECTION IN A MOTOR DRIVE

(71) Applicant: Rockwell Automation Technologies, Inc., Mayfield Heights, OH (US)

(72) Inventors: Gerry M. Nagel, Sussex, WI (US); Robert H. Schmidt, Germantown, WI (US); Joachim Thomsen, Hamburg (DE); Jon P. Vanderpas, Appleton, WI (US); Vincent Bourrelly, Hoeilaart (BY); Aderiano M. da Silva, Franklin, WI (US); Jonathan D. Hoffman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/584,236

(22) Filed: Sep. 26, 2019

(51) Int. Cl.
*H02H 7/08* (2006.01)
*H02P 29/024* (2016.01)
*G05B 13/02* (2006.01)
*G05B 19/048* (2006.01)
*H02P 29/032* (2016.01)

(52) U.S. Cl.
CPC ........ *H02P 29/024* (2013.01); *G05B 13/0265* (2013.01); *G05B 19/048* (2013.01); *H02P 29/032* (2016.02)

(58) Field of Classification Search
CPC ................ G05B 19/0428; G05B 23/0254
See application file for complete search history.

(56) References Cited

U.S. PATENT DOCUMENTS

| 7,424,396 | B2 | 9/2008 | Dodeja et al. |
| 8,810,173 | B2 | 8/2014 | Li et al. |
| 8,886,574 | B2 | 11/2014 | Yuan et al. |
| 10,187,003 | B2 | 1/2019 | Vinson et al. |
| 2015/0268133 | A1* | 9/2015 | Ranjan ............ G06F 11/2205 702/183 |
| 2018/0196104 | A1 | 7/2018 | Chang |
| 2019/0101436 | A1 | 4/2019 | Li et al. |

* cited by examiner

*Primary Examiner* — Karen Masih
(74) *Attorney, Agent, or Firm* — Boyle Fredrickson, SC

(57) ABSTRACT

A system and method for real-time detection of anomalies in a motor drive includes a controller receiving one or more signals corresponding to real-time operation of a controlled system. The controller samples the real-time signal during operation of the controlled system and maintains a moving window of the sampled data. A signature of the sampled data within the moving window is then generated. Each signature corresponds to operation of the controlled system within the period of time defined by the moving window. An identifier and a number of occurrences of each signature may be stored with the signature. An initial table of expected signatures may be generated, for example, by executing a training, or learning, period within the control system. The controller compares each real-time signature against the table of expected signatures to detect the occurrence of an anomaly.

20 Claims, 4 Drawing Sheets

METHOD AND SYSTEM FOR REAL-TIME ANOMALY DETECTION IN A MOTOR DRIVE

BACKGROUND INFORMATION

The subject matter disclosed herein relates generally to a method and system for real-time detection of an anomaly in an industrial control system and, more specifically, to a method and system for monitoring a real-time signal within a motor drive corresponding to operation of the industrial control system to identify anomalous performance within the system.

Industrial controllers are specialized computer systems used for the control of industrial processes or machinery, for example, in a factory environment. Generally, an industrial controller executes a stored control program that reads inputs from a variety of sensors associated with the controlled process and machine and, sensing the conditions of the process or machine and based on those inputs and a stored control program, calculates a set of outputs used to control actuators controlling the process or machine.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Many industrial control systems utilize electrical rotating machines, such as electric motors or generators, as one type of actuator to drive a portion of the controlled system. Electric machines include a stationary component (i.e., the stator) and a rotating component (i.e., the rotor). In electric motors, a magnetic field is established in the rotor, for example via magnets mounted to the rotor or via an electrical current applied to or induced in a coil wound on the rotor. A second, rotating magnetic field is established as a result of the application of a controlled voltage to the stator, and the rotation of the magnetic field in the stator causes the magnetic field in the rotor to rotate, thereby causing rotation of the rotor. A shaft or other drive member is mounted to the rotor and extends outside the rotor housing providing a mechanical coupling to between the motor and a drive train in the controlled system.

As is known to those skilled in the art, motor drives are often utilized to control operation of a motor. The motor drive may receive a command signal from the industrial controller corresponding to desired operation of a motor connected to the motor drive. The motor drive converts input power, from either an alternating current (AC) source or a direct current (DC) source, to the controlled voltage applied to the stator. The motor shaft may be coupled either directly or via a gearbox to a drive member, such as a ball-screw or a rack and pinion used to position one axis of the machine. Under normal operation, the motor drive supplies the controlled voltage to the motor to achieve the desired operation of the driven member in the system.

However, anomalies may occur within the controlled system which may lead to abnormal operation or failure of a component within the controlled system. In addition to having the potential for damaging a component of the controlled system, the anomaly may cause a part manufactured by the controlled system to be out of tolerance or damaged. Anomalies may, for example, take the form of unexpected debris along a process line, sudden wear or failure of a component, a part on which the process is acting being out of mechanical tolerance prior to the action being taken, and the like. In order to avoid further damage to the controlled system or to product manufactured by the system, it would be desirable to detect an anomaly when it occurs within the controlled system.

Historically, it has been known to include mechanical assemblies such as overload clutches or break-away couplings to detect anomalies and/or protect equipment within a controlled system. For example, a coupling within a drivetrain may be designed to fail at a lower torque level than a torque level that would cause damage to other components in the drivetrain should a mechanical jam occur. Alternately, an overload clutch may allow for temporary operation of a system at an increased torque resulting from a partial jam or an out of tolerance component. The overload clutch allows the drivetrain to slip within the clutch if a maximum torque is exceeded, again preventing damage to the motor or drivetrain; however, and the overload clutch then re-engages within the drivetrain to resume operation when the maximum torque is no longer exceeded.

Use of a mechanical assembly to protect against the occurrence of an anomaly is not without certain drawbacks. The mechanical assembly requires additional space within the drive train. Further, the mechanical assemblies may require manual setup and/or adjustment to achieve a desired torque rating at which the mechanical assembly will fail or otherwise remove the torque from the drivetrain (i.e., begin to slip). According to still other applications, it may be desirable for the mechanical assembly to engage only during specific periods of operation within a machine cycle to protect critical operations. This may require manual intervention to set a mechanical assembly prior to the critical operation or additional mechanical assemblies to engage and disengage a protective assembly. Mechanically protecting a system from anomalous behavior can create significant additional complexity and expense.

In some occurrences, the anomaly may not be detected or may only be detected at a later point in time. For example, an out of tolerance part is passed on to the next station and work at the station at which the anomaly occurred returns to normal. Similarly, a jam may resolve itself by ejecting a part that may not have completed manufacture. While the anomaly may be resolved, the likely result is a manufactured part that is damaged or otherwise unacceptable. If the anomaly that caused an initial defective part remains, it may also cause multiple defective parts. Identifying the manufacturing defect in the part may require subsequent inspection. If inspection occurs at a later point in the system or only periodically on selected parts, multiple parts may be incorrectly manufactured or damaged before inspection detects the anomaly. It is also possible that the incorrectly manufactured or damage part is not detected until received by an end user. Thus, it would be desirable to detect the occurrence of an anomaly in real time.

In certain applications, specific types of anomalies may be anticipated. For example, it may be known that bearing wear in a motor may result in vibration of the motor and/or in vibration of additional components in the drive train. A sensor may be provided to detect vibration and, when vibration occurs transmit a signal back to the industrial controller. The industrial controller may be programmed to take appropriate action, such as posting an alarm for a technician to service the motor or bringing the system to a controlled stop to prevent damage to other components within the system or to prevent manufacture of parts by the controlled system that would fail inspection. However, providing the sensor requires additional space and design considerations for mounting and routing of a cable to the sensor. Further, the industrial controller must be programmed to receive the signal and determine whether a vibration is an anomaly or normal operation, again adding complexity and cost to the system.

However, other types of anomalies cannot be anticipated. A mechanical jam due to unexpected debris or sudden failure of a mechanical component may cause an unexpected anomaly. Similarly, if a part on which the process is to operate is initially out of tolerance, it may result in unexpected operation of the system. It is not possible to predict every source of anomaly and provide a sensor, or sensors, to detect the anomaly. Further, it may be impractical or create significant expense to provide sensors to detect every anomaly that may be anticipated. Even for those anomalies in which a sensor is provided, the potential exists for failure of the sensor or wiring to the sensor, resulting in an anomaly not being detected.

Thus, it would be desirable to provide a system and method for real-time detection of anomalies in an industrial control system that does not require external sensors and that detects the occurrence of unexpected events.

BRIEF DESCRIPTION

The subject matter disclosed herein describes a system and method for real-time detection of anomalies by a motor drive executing in an industrial control system that does not require external sensors and that detects the occurrence of unexpected events. A controller within the motor drive receives one or more signals corresponding to real-time operation of the controlled system. The controller samples the real-time signal during operation of the controlled system and maintains a moving window of the sampled data. A signature of the sampled data within the moving window is then generated. The signature may be generated directly from the time series of sampled data. Alternately, a frequency response of the sampled data may first be generated and the signature may be generated based on the frequency response.

Each signature corresponds to operation of the controlled system within the period of time defined by the moving window. The controller uses the signature to identify occurrence of an anomaly within this period of time. Each signature may be assigned an identifier corresponding to the signature. The signature and identifier are stored in memory of the controller. Additionally, the controller may maintain a record of the number of occurrences of the signature. As each new signature is identified, it is compared against the signatures previously stored in memory. When a new signature is generated, it is assigned a new identifier and is identified as an anomaly. Thus, the controller is able to identify any abnormal operating condition corresponding to the signal being monitored.

An initial table of expected signatures may be generated, for example, by executing a training, or learning, period within the control system. During the initial training period, the controller expects to receive new signatures. Rather than identifying each new signature as an anomaly, the controller assigns a new identifier to the signature and stores the signature in memory. The controller may still maintain a record of the number of occurrences of each signature and store the number of occurrences along with the signature in memory. At the end of the training period, a table of expected signatures has been established and the controller compares each real-time signature against the table of expected signatures to detect the occurrence of an anomaly.

According to one embodiment of the invention, a method of real-time anomaly detection in an industrial control system is disclosed. At least one real-time signal is received at a controller within the industrial control system, where the real-time signal corresponds to operation of the industrial control system. The at least one real-time signal is sampled in the controller at a periodic interval, and a predefined number of samples of the at least one real-time signal are stored in a memory of the controller. A real-time signature of the predefined number of samples is generated with the controller. The real-time signature is compared to a set of expected signatures, and an indicator of a real-time anomaly is set within the controller when the real-time signature does not correspond to one of the expected signatures in the set of expected signatures.

According to another embodiment of the invention, a system for real-time anomaly detection by a motor drive configured to operate in an industrial control system includes a memory and a controller. The memory is configured to store a set of expected signatures and a series of instructions. The controller is configured to execute the series of instructions to receive at least one real-time signal corresponding to operation of the industrial control system and to sample the at least one real-time signal at a periodic interval. A predefined number of samples of the at least one real-time signal are stored in the memory, and a real-time signature of the predefined number of samples is generated. The real-time signature is compared to a set of expected signatures, and an indicator of a real-time anomaly is set when the real-time signature does not correspond to one of the expected signatures.

According to still another embodiment of the invention, a method for detecting an anomaly in real-time for an industrial control system is disclosed. A real-time signal, corresponding to operation of the industrial control system, is sampled at a periodic interval by a controller in the industrial control system. A duration of a moving window is defined to extend for a plurality of the periodic intervals. Multiple values of the real-time signal sampled at the periodic interval are stored in a memory of the controller for the duration of the moving window, and a real-time pattern is determined from the values of the real-time signal stored in the memory. The real-time pattern is compared to a set of expected patterns stored in the memory, and an indicator of a real-time anomaly is set within the controller when the real-time pattern does not correspond to one of the expected patterns in the set of expected patterns.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
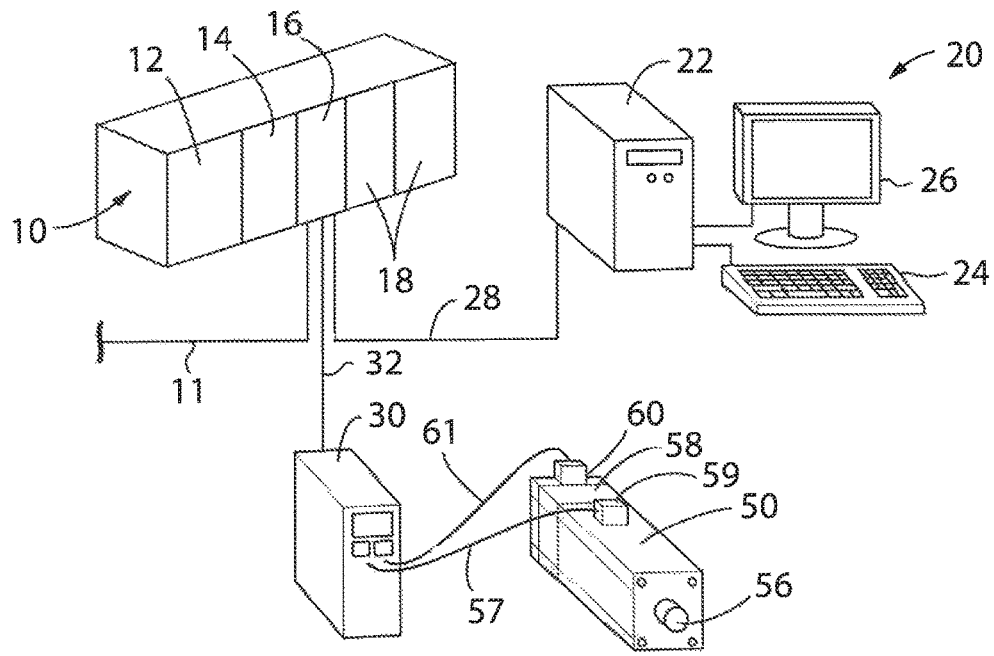
FIG. 1 is a perspective view of an exemplary industrial control application incorporating the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary industrial control system includes an industrial controller 10 in communication with a motor drive 30 and a remote processing device 20. As illustrated, the industrial controller 10 is modular and may be made up of numerous different modules connected together in a rack or mounted to a rail. Additional modules may be added or existing modules removed and the industrial controller 10 reconfigured to accommodate the new configuration. Optionally, the industrial controller 10 may have a predetermined and fixed configuration. In the illustrated embodiment, the industrial controller 10 includes a power supply module 12, a processor module 14, a network module 16, and two additional modules 18 that may be selected according to the application requirements and may be, for example, analog or digital input or output modules.

One or more remote processing devices 20 may be connected to the industrial control network. The remote processing device may be an operator interface located proximate to the industrial controller, a desktop computer located at a separate facility from the industrial controller, or a combination thereof. The remote processing device 20 may include a processing unit 22, input device 24, including, but not limited to, a keyboard, touchpad, mouse, trackball, or touch screen, and a display device 26. It is contemplated that each component of the remote processing device may be incorporated into a single unit, such as an industrial computer, laptop, or tablet computer. It is further contemplated that multiple display devices 26 and/or multiple input devices 24 may be distributed about the controlled machine or process and connected to one or more processing units 22. The remote processing device 20 may be used to display operating parameters and/or conditions of the controlled machine or process, receive commands from the operator, or change and/or load a control program or configuration parameters. An interface cable 28 connects the remote processing device 20 to the industrial controller 10.

The industrial controller 10 is connected to other devices by one or more networks according to the application requirements. As illustrated, interface cables 28, 32 connect the industrial controller 10 to the remote processing device 20 and the motor drive 30, respectively. It is contemplated that the interfaces cables 28, 32 may be custom cables configured to communicate via a proprietary interface or may be any standard industrial network cable, including, but not limited to, Ethernet/IP, DeviceNet, or ControlNet. The network module 16 is configured to communicate according to the protocol of the network to which it is connected and may be further configured to translate messages between two different network protocols. An additional network cable 11 may be a standard Ethernet cable connected to a network external from the industrial network, such as the Internet or an intranet.

The industrial control network further includes a motor drive 30 and a motor 50. The motor drive 30 is connected to the industrial controller 10 via a network cable 32. As illustrated, the motor drive 30 is connected to a network module 16 to receive communications from the industrial controller 10. The communications may include configuration packets or operating commands generated by the processing module 14. Optionally, the industrial controller 10 may include another module (not shown) dedicated to communicating with the motor drive 30. The additional module may be, for example, a servo module, which is configured to generate motion profiles, velocity profiles, or other command profiles and transmit the commands to the motor drive 30.

The motor drive 30 receives the commands, which indicate a desired operation of the motor 50, and generate a variable frequency and variable amplitude voltage for the motor to achieve the desired operation. A power cable 57 extends between the motor drive 30 and a junction box 59 on the motor to supply the variable frequency and variable amplitude voltage to the motor. A feedback cable 61 extends between an encoder 60 mounted to the rear of the motor 50 and the motor drive 30. The encoder 60 generates a position feedback signal corresponding to an angular position of the motor 50. The position feedback signal may be provided directly to the motor drive via the feedback cable or some initial processing, such as inserting the position information into a data packet for serial communications or converting the position signal to a velocity signal, may be performed within the encoder 60 prior to sending the feedback signal to the motor drive 30. The illustrated embodiment further includes a brake module 58 mounted between the motor 50 and the encoder 60. A control signal is provided from an output 44 (see FIG. 2) of the motor drive 30 to release the brake and a feedback signal may be provided from the brake 58 to the motor drive 30 to indicate the brake is opened. It is further contemplated that other sensors and/or actuators may be mounted to or within an extension of the housing for the motor 50 according to application requirements. For example, sensors such as a vibration sensor 62 or a temperature sensor may be mounted at various locations within, on, or proximate to the housing of the motor 50 to monitor operating performance. Each of the sensors generates a signal that may be transmitted directly to the motor drive 30 or to an additional control module embedded within the housing of the motor 50. The additional control module may include, for example, logic circuits such as analog to digital converters, buffers, communication ports, processors and the like to receive the signals from each sensor and to convert the signals to another format and/or to generate data packets in which data is inserted for transmission to the motor drive 30. Additional conductors and/or cables may be connected between the motor drive 30 and the motor 50 according to the application requirements to transfer each of the control and/or feedback signals between the motor drive 30 and the motor 50.

Figure 2:
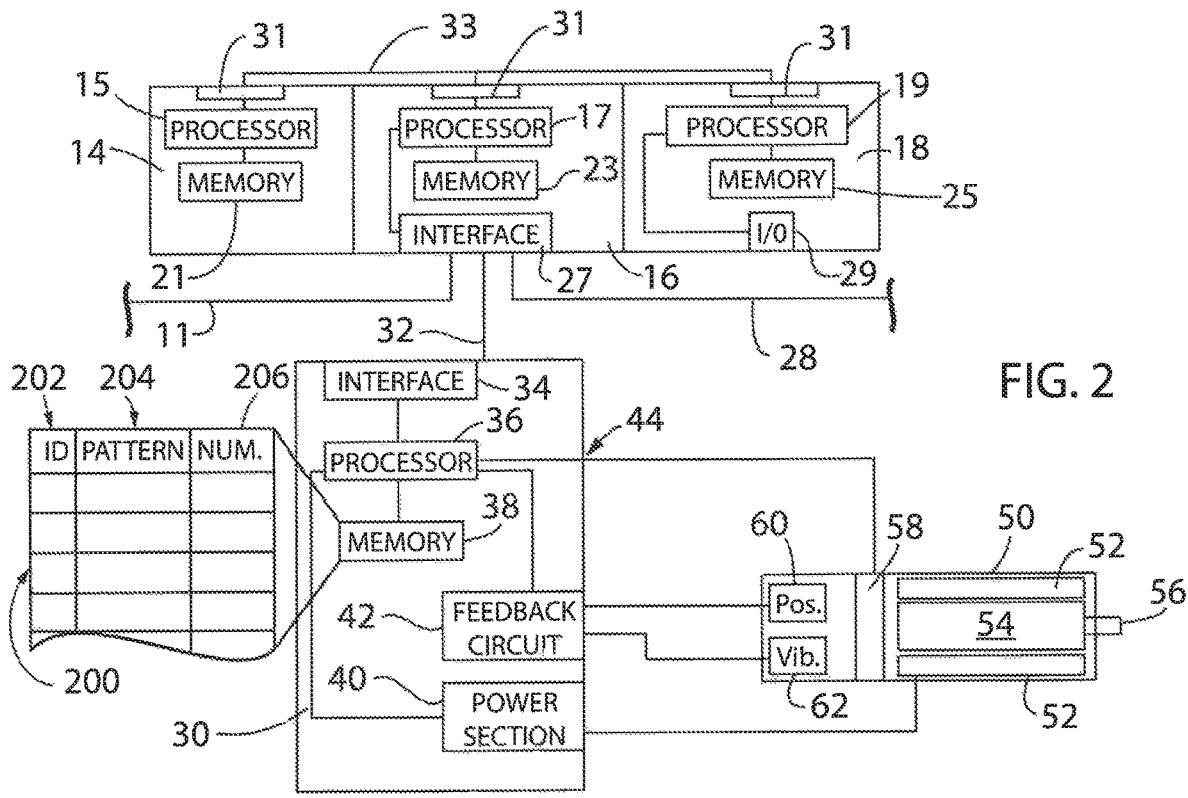
FIG. 2 is a partial block diagram representation of the exemplary industrial control application of FIG. 1.

Referring next to FIG. 2, a portion of the exemplary industrial control network shown in FIG. 1 is illustrated in block diagram form. Each of the modules 14, 16, 18 in the industrial controller 10 may include a processing device and memory. The functionality and size of the processing device and memory may vary according to the requirements of each module. As illustrated, each module 14, 16, 18 includes a processor 15, 17, 19 configured to execute instructions and to access or store operating data and/or configuration parameters stored in the corresponding memory device 21, 23, 25. The processors 15, 17, 19 may be any suitable processor according to the module requirements. It is contemplated that processors 15, 17, 19 may include a single processing device or multiple processing devices executing in parallel and may be implemented in separate electronic devices or incorporated on a single electronic device, such as a microprocessor, a field programmable gate array (FPGA) or application specific integrated circuit (ASIC). Similarly, the memory devices 21, 23, 25 may be a single device, multiple devices or may be incorporated in part or in whole within the FPGA or ASIC.

The modules may further include additional logic and/or control circuits according to the module requirements. Each I/O module 18, for example, includes input and/or output terminals and the associated circuitry 29 to connect the I/O module to an external device. The network module 16 includes a network interface 27 configured to receive data packets from the network media connected to the interface. According to the illustrated embodiment, the network interface 27 is connected to an external network via an Ethernet cable 11 as well as the motor drive 30 and remote processing device 20 via the respective network cables 32, 28. The network module 16 may be configured to function as a gateway between networks and to convert data packets between protocols.

The motor drive 30 also includes a processing device and memory. As illustrated, the motor drive 30 includes a processor 36 configured to execute instructions and to access or store operating data and/or configuration parameters stored in the corresponding memory device 38. The processor 36 may be any suitable processor according to the module requirements. It is contemplated that processor 36 may include a single processing device or multiple processing devices executing in parallel and may be implemented in separate electronic devices or incorporated on a single electronic device, such as a microprocessor, a field programmable gate array (FPGA) or application specific integrated circuit (ASIC). Similarly, the memory devices 38 may be a single device, multiple devices or may be incorporated in part or in whole within the FPGA or ASIC. The motor drive 30 also includes a network interface 34 to communicate with the industrial controller 10 and/or other devices via the industrial network. A feedback circuit 42 receives feedback signals from the motor 50 and from the devices mounted in, on, or proximate to the motor 50. According to the illustrated embodiment, a position sensor, such as an encoder 60, and a vibration sensor 62 are mounted to the motor 50 and provide feedback signals to the motor drive 30. The motor drive also includes a power section 40, where the power section 40 is configured to receive either AC or DC power from an external source and convert the external power to the variable frequency and variable amplitude voltage supplied to the motor. The variable frequency and variable amplitude voltage is provided to a stator 52 of the motor 50 which causes the rotor 54 and, in turn, the drive shaft 56 of the motor to rotate, thereby controlling operation of a machine, gearbox, or other load 55 that is mechanically coupled to the drive shaft 56.

Figure 3:
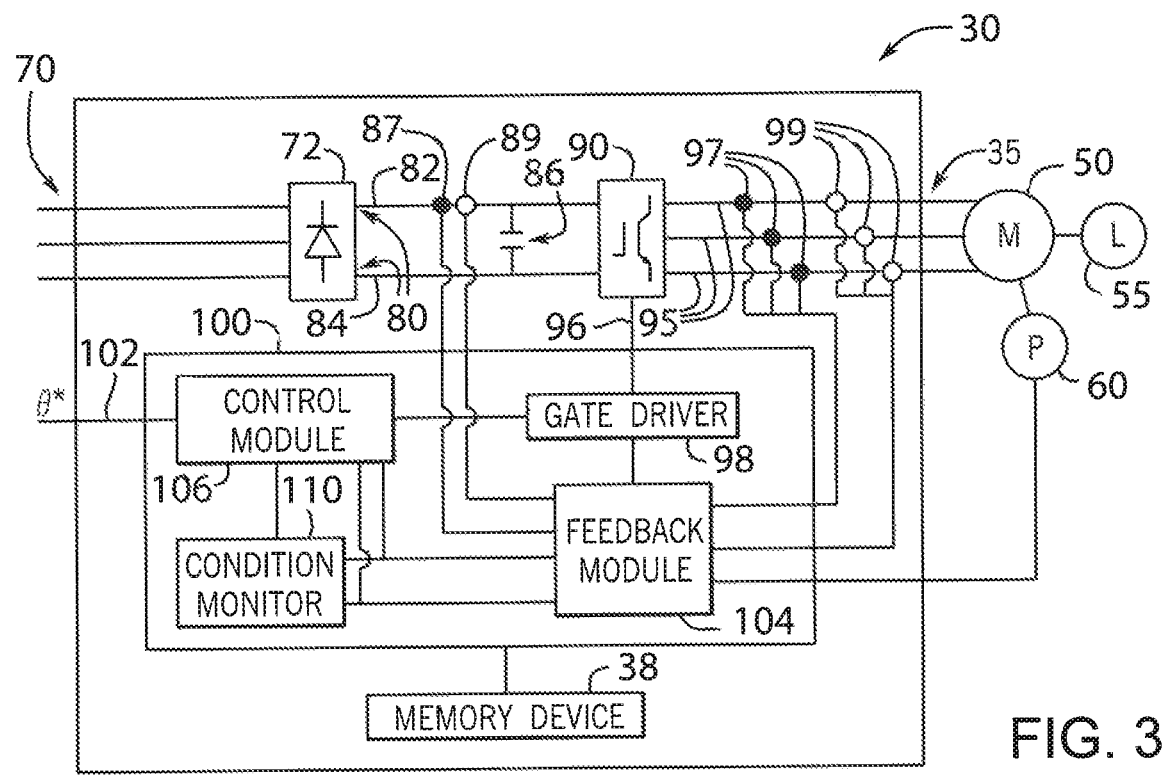
FIG. 3 is a block diagram of a motor drive incorporating one embodiment of the present invention.
Figure 4:
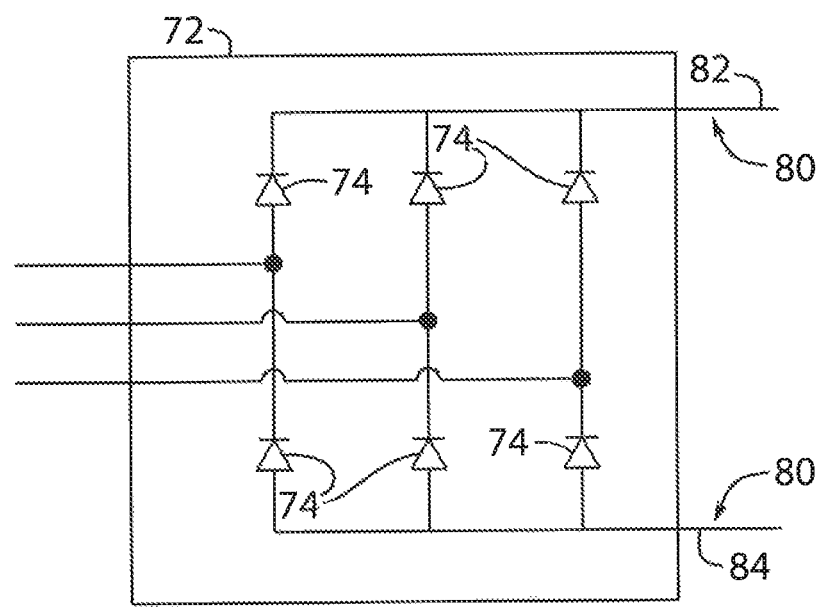
FIG. 4 is a block diagram representation of a rectifier section from the motor drive of FIG. 3.

Turning next to FIG. 3, an exemplary motor drive 30, which may be used in conjunction with the various embodiments of the invention disclosed herein, is configured to receive a three-phase AC voltage at an input 70 of the motor drive 30 which is, in turn, provided to a rectifier section 72 of the motor drive 30. The rectifier section 72 may include any electronic device suitable for passive or active rectification as is understood in the art. With reference also to FIG. 4, the illustrated rectifier section 72 includes a set of diodes 74 forming a diode bridge that rectifies the three-phase AC voltage to a DC voltage on the DC bus 80. Optionally, the rectifier section 72 may include other solid-state devices including, but not limited to, thyristors, silicon-controlled rectifiers (SCRs), or transistors to convert the input power 70 to a DC voltage for the DC bus 80. The DC voltage is present between a positive rail 82 and a negative rail 84 of the DC bus 80. A DC bus capacitor 86 is connected between the positive and negative rails, 82 and 84, to reduce the magnitude of the ripple voltage resulting from converting the AC voltage to a DC voltage. It is understood that the DC bus capacitor 86 may be a single capacitor or multiple capacitors connected in parallel, in series, or a combination thereof. The magnitude of the DC voltage between the negative and positive rails, 84 and 82, is generally equal to the magnitude of the peak of the AC input voltage.

Figure 5:
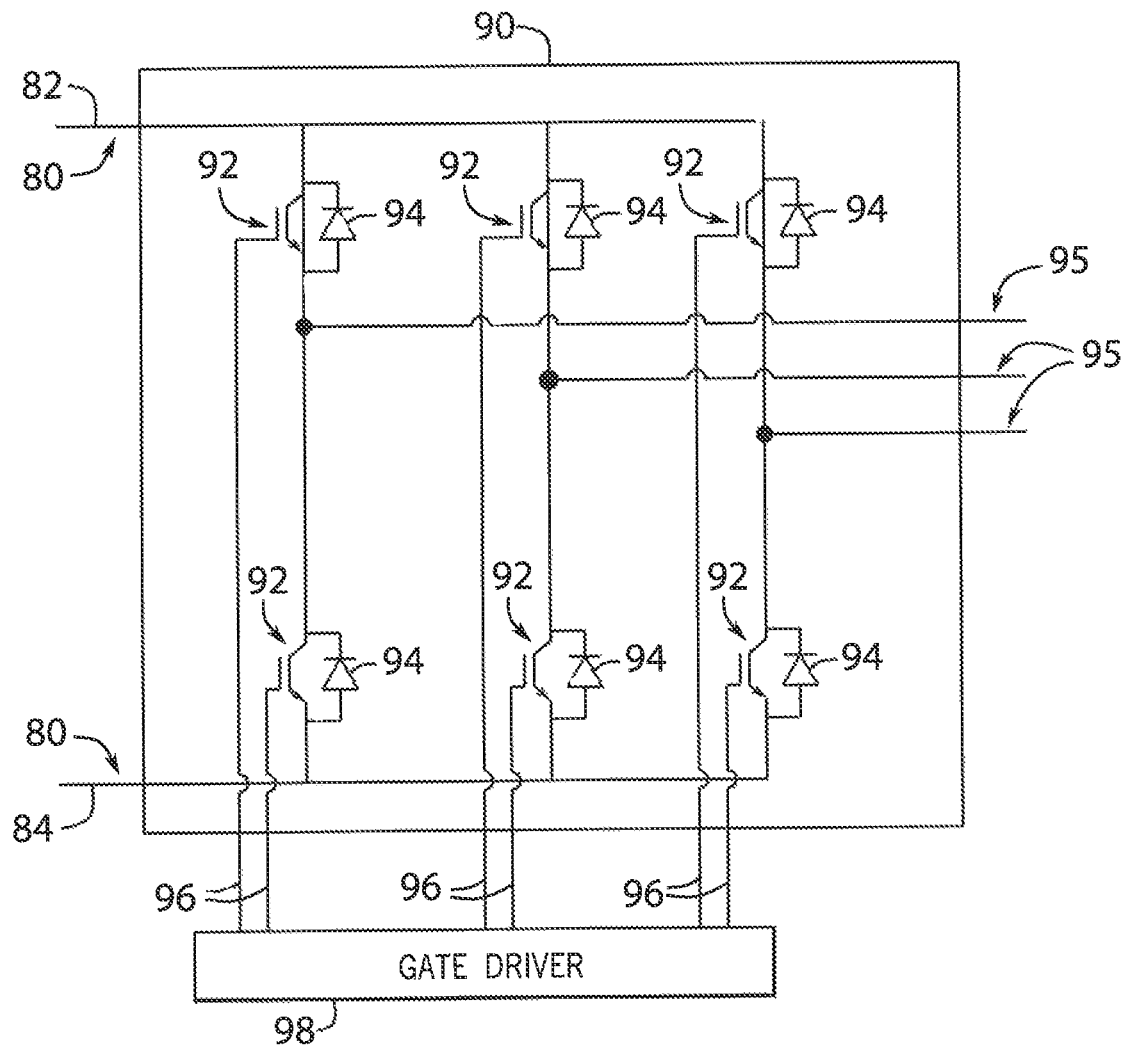
FIG. 5 is a block diagram representation of an inverter section and gate driver module from the motor drive of FIG. 3.

The DC bus 80 is connected in series between the rectifier section 72 and an inverter section 90. Referring also to FIG. 5, the inverter section 90 consists of switching elements, such as transistors, thyristors, or SCRs as is known in the art. The illustrated inverter section 90 includes an insulated gate bipolar transistor (IGBT) 92 and a free-wheeling diode 94 connected in pairs between the positive rail 82 and each phase of the output voltage as well as between the negative rail 84 and each phase of the output voltage. Each of the IGBTs 92 receives gating signals 96 to selectively enable the transistors 92 and to convert the DC voltage from the DC bus 80 into a controlled three phase output voltage to the motor 50. When enabled, each transistor 92 connects the respective rail 82, 84 of the DC bus 80 to an electrical conductor 95 connected between the transistors 92 and an output terminal 35 of the motor drive 30. The electrical conductor 95 is selected according to the application requirements (e.g., the rating of the motor drive 30) and may be, for example, a conductive surface on a circuit board to which the transistors 92 are mounted or a bus bar connected to a terminal from a power module in which the transistors 92 are contained. The output terminals 35 of the motor drive 30 may be connected to the motor 50 via the power cable 57 including electrical conductors connected to each of the output terminals 35.

One or more modules are used to control operation of the motor drive 30. According to the embodiment illustrated in FIG. 3, a controller 100 includes the modules and manages execution of the modules. The illustrated embodiment is not intended to be limiting and it is understood that various features of each module discussed below may be executed by another module and/or various combinations of other modules may be included in the controller 100 without deviating from the scope of the invention. The modules may be stored programs executed on one or more processors, logic circuits, or a combination thereof. The controller 100 may be implemented, for example, in a processor 36 (as shown in FIG. 2), application specific integrated circuit (ASIC), field programmable gate array (FPGA), or other such customizable device. The motor drive 30 also includes a memory device 38 in communication with the controller 100. The memory device 38 may include transitory memory, non-transitory memory or a combination thereof. The memory device 38 may be configured to store data and programs, which include a series of instructions executable by the controller 100. The controller 100 is in communication with the memory 38 to read the instructions and data as required to control operation of the motor drive 30.

The controller 100 receives a reference signal 102 identifying desired operation of the motor 50 connected to the motor drive 30. The reference signal 102 may be, for example, a position reference ($\theta^*$), a speed reference ($\omega^*$), or a torque reference ($T^*$). For a high-performance servo control system, the reference signal 102 is commonly a position reference signal ($\theta^*$) as shown in the illustrated embodiment.

The controller 100 also receives feedback signals indicating the current operation of the motor drive 30. According to the illustrated embodiment, the controller 100 includes a feedback module 104 that may include, but is not limited to, analog to digital (A/D) converters, buffers, amplifiers, and any other components that would be necessary to convert a feedback signal in a first format to a signal in a second format suitable for use by the controller 100 as would be understood in the art. The feedback module 104 may incorporate or be used in cooperation with the feedback circuit 42 shown in FIG. 2. The motor drive 30 may include a voltage sensor 87 and/or a current sensor 89 on the DC bus 80 generating a feedback signal corresponding to the magnitude of voltage and/or current present on the DC bus 80. The motor drive 30 may also include one or more voltage sensors 97 and/or current sensors 99 on the output phase(s) of the inverter section 90 generating a feedback signal corresponding to the magnitude of voltage and/or current present on the electrical conductors 95 between the inverter section 90 and the output 35 of the motor drive.

The controller 100 utilizes the feedback signals and the reference signal 102 to control operation of the inverter section 90 to generate an output voltage having a desired magnitude and frequency for the motor 50. The feedback signals are processed by the feedback module 104 and converted, as necessary, to signals for the control module 106. The control module 106 also receives the reference signal 102 and executes responsive to the reference signal 102 and the feedback signals to generate a desired output voltage signal to a gate driver module 98. The gate driver module 98 generates the gating signals 96, for example, by pulse width modulation (PWM) or by other modulation techniques. The gating signals 96 subsequently enable/disable the transistors 92 to provide the desired output voltage to the motor 50, which, in turn, results in the desired operation of the mechanical load 55 coupled to the motor 50.

Figure 6:
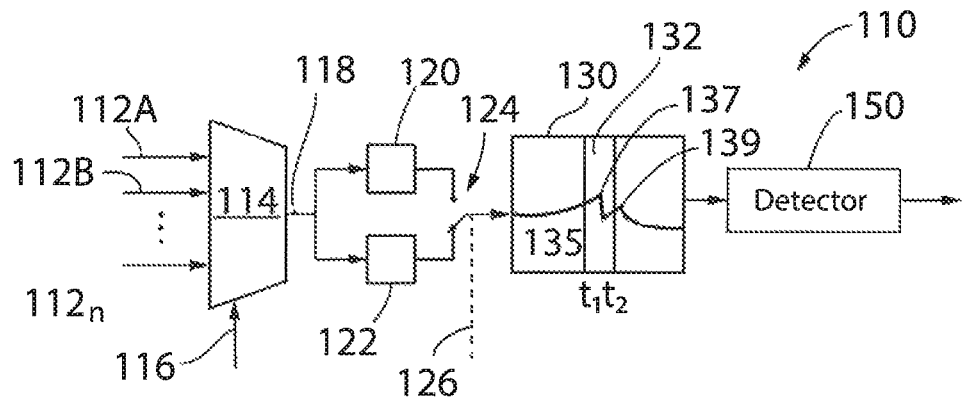
FIG. 6 is a block diagram representation of one embodiment of a system for detecting anomalies executing in the controller from the motor drive of FIG. 3.

In operation, the system disclosed herein provides real-time detection of anomalies occurring in an industrial control system. With reference to FIGS. 3 and 6, a condition monitor module 110 executing in the controller 100 receives at least one real-time signal 112 corresponding to operation of the controlled system and provides an indication of the occurrence of an anomaly in the monitored signal. According to the illustrated embodiment, the condition monitor module 110 is executing in the motor drive 30. For ease of discussion, this embodiment will be discussed herein. It is contemplated that a condition monitor module 110 may execute in the industrial controller 10 as well. An advantage to executing the condition monitor module 110 in the motor drive 30 is that multiple modules 110 may be distributed throughout the controlled system or process, where each module 110 is in a separate motor drive 30 and each module 110 may monitor different signals to detect anomalies. Another advantage to executing the condition monitor module 110 in the motor drive 30 is that the module may monitor signals within the motor drive 30, such as motor position, velocity, current, or torque feedback or reference signals without transmitting the signals back to the industrial controller 10. According to still another embodiment of the invention, a condition monitor module 110 may execute in one or motor drives 30 and a separate condition monitor module 110 may execute in the industrial controller 10.

As shown in FIG. 6, it is contemplated that various real-time signals 112 may be provided as inputs to the condition monitor module 110. According to the illustrated embodiment, a first real-time signal 112A and a second real-time signal 112B are shown. It is contemplated that a single real-time signal 112 or up to "n" number of real-time signals 112$n$ may be provided. The signals may be reference signals or feedback signals, signals that are used directly as sampled or signals that have an initial processing step performed, or a combination thereof. A selection module 114 receives a control signal 116 to indicate which signal, or signals, are to be monitored for an anomaly by the condition monitor module 110. According to one embodiment of the invention, the control signal 116 may be defined in a parameter stored in the memory 38 of the motor drive 30. A value of the control signal 116 may be manually set in a configuration parameter during commissioning to select the desired real-time signal to be monitored. It is contemplated that multiple signals may be monitored in parallel. Alternately, identification of which real-time signal to be monitored may be done during a training, or commissioning process, as will be discussed in more detail below, where the training process sets a value in the control signal to identify which of the real-time signals to monitor.

According to still another aspect of the invention, the motor drive 30 may receive a control signal 116 from the industrial controller 10 such that different real-time signals 112 may be monitored at different points in a control program executing on the industrial controller 10. There may be, for example, periods of operation by the motor 50 controller by the motor drive during which a high torque is required for normal operation. The same motor 50 may have certain critical periods of operation, according to the application requirements and as defined in the control program executing on the industrial controller 10, during which different operating characteristics would be expected. For example, a controlled operation may utilize different "recipes" where each recipe is used to produce a different component, different compound, perform a different operation, or the like. However, within each recipe a series of normal patterns of operation exist. Thus, the industrial controller 10 may set the control signal 116 to a first value(s) to initiate monitoring of real-time signal(s) 112 corresponding to the first selected recipe during one mode of operation and may set the control signal 116 to a second value(s) to initiate monitoring of real-time signal(s) 112 corresponding to the second selected recipe during another mode of operation.

After selecting the real-time signal 112, or signals, to be monitored, each signal 112 is sampled at a periodic interval. It is contemplated that the periodic interval may be a fixed interval or configurable and selected according to the application requirements. A first periodic interval may be defined for a first signal and a second periodic interval may be defined for a second signal. Because the signal being monitored is a real-time signal 112 and because it is desirable to detect an anomaly as quickly as possible to avoid or minimize any damage that may result, it is contemplated that the periodic interval is small, resulting in rapid sampling of the signal. According to one embodiment of the invention, the periodic interval may range from about twenty microseconds to about two hundred microseconds. For certain, slower changing signals, such as temperature, it is contemplated that periodic interval may be selected in milliseconds rather than microseconds. Each sampled signal may be stored in a buffer in the memory 38 of the motor drive 30. According to one aspect of the invention, the buffer may be a first-in-first-out (FIFO) style buffer, where each sampled value is stored as the newest value and each prior sampled value is shifted back one space in the buffer as a new value is sampled. The oldest value in the buffer is dropped from the buffer when the total number of samples stored within the buffer is equal to the length of the buffer. It is contemplated that the values for tens to thousands of samples of each signal 112 may be stored in the buffer for subsequent processing and anomaly detection. According to another aspect of the invention, the buffer may be a stepped buffer, where data is sampled as sets of data over a predefined duration. For example, a signal may be sampled at a rate of ten samples per second for ten seconds. The resultant one hundred samples are used in subsequent processing while a new set of samples is acquired.

Each sampled signal is represented by reference numeral 118 in FIG. 6. For ease of discussion, the anomaly detection will be discussed with respect to a single sampled signal 118. It is understood that multiple sampled signals 118 may be processed in tandem. The sampled signal 118 includes each of the values stored in memory 38. The sampled signal 118 may be processed either as a time-series of sampled values or as a frequency response of the sampled values. The parallel processing paths 120, 122 represent processing of the sampled signal 118 to generate either a time-series or a frequency response of the sample values. A switch 124 is provided to select the desired set of sampled values and a control signal 126 is used to toggle the switch 124 between the two sets of sampled values.

It is contemplated that the first processing path 120 results in a frequency response of the sampled values and that the second processing path 122 results in a time-series of the sampled values. Because the sampled signal 118 is a time-series of sampled values, there may be no subsequent processing of the sampled signal 118 along the second processing path 122. Optionally, the second processing path 122 may include a trim function to account for variations in the sampled signal 118 over time. Certain sampled signals 118 may change as a result of variations in temperature or with the controlled process itself. Web handling equipment, for example, may expect a greater torque when a new roll of material is present and a gradually reducing torque as the material on the roll is spooled out onto the web. The trim function compensates for and eliminates the detection of an anomaly for known variations in a sampled signal 118. The first processing path 120 may include a discrete Fourier transform (DFT) function to convert sampled signals into a frequency response of the sampled values. The first processing path 120 may also include a trim function prior to the DFT function to similarly account for known variations over time for the sampled signal 118.

After selecting a time-series of data or a frequency response for each sampled signal 118, the selected data is provided to a window function 130. According to the illustrated embodiment in FIG. 6, a set of sampled data 135 includes a first anomaly 137 and a second anomaly 139. A window 132 is provided which analyzes a portion of the set of sampled data 135. According to the illustrated embodiment, the duration of the window 132 is less than the duration of the set of sampled data 135 provided to the window function. A portion of the set of sampled data 135 is analyzed at a time with the window 132 moving sequentially along the set of data 135 until the entire set of sampled data 135 has been analyzed. Optionally, the duration of the window 132 may be equal to the duration of the entire set of sampled data 135 and the entire set of sampled data 135 may be analyzed at one time. The data selected from the window function 130 is then passed as an input to an anomaly detector module 150.

Figure 7:
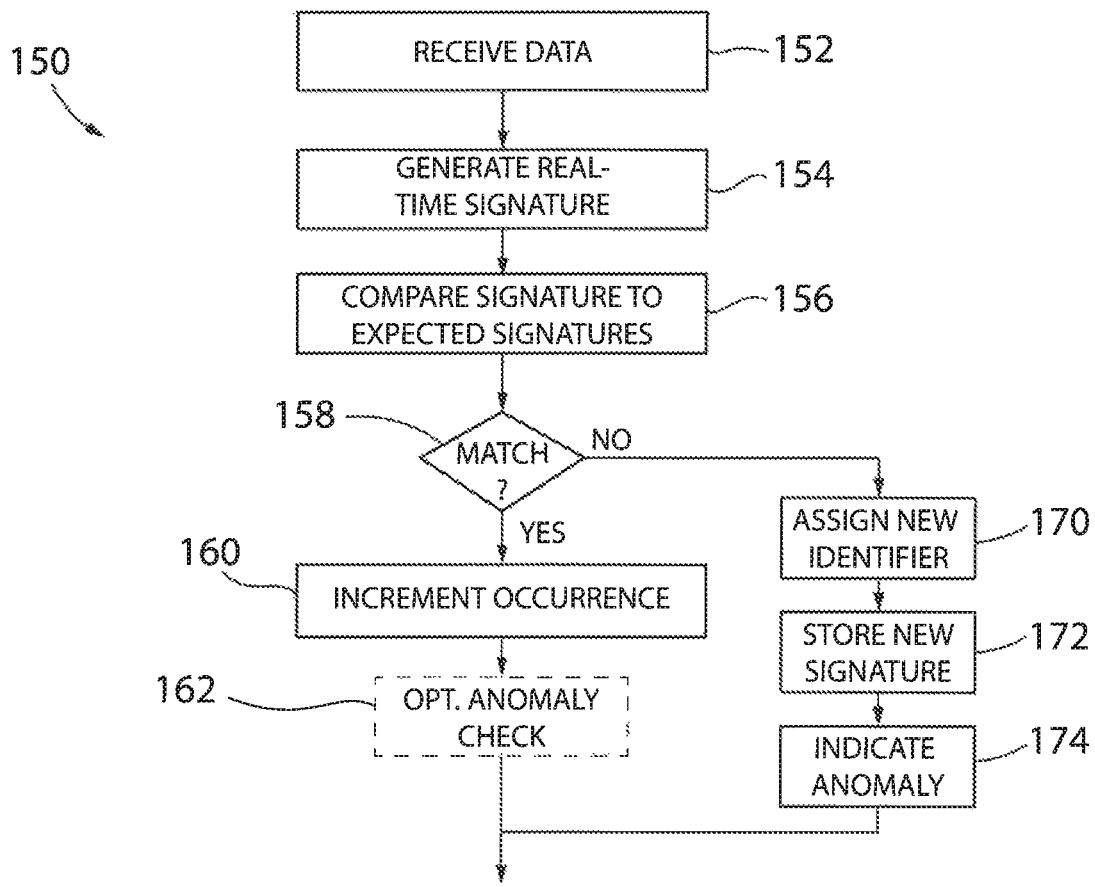
FIG. 7 is a flow diagram representation of the detection block of FIG. 6.

Turning next to FIG. 7, an exemplary embodiment of the steps performed by the anomaly detector module 150 are illustrated. The anomaly detector module 150 receives the data from the window function 130, as shown in step 152. From this data, the anomaly detector module 150 determines a real-time signature of the data received, as shown in step 154. In a first embodiment of the invention, the real-time signature may be generated by a hash function or other mathematical function to generate a data value of fixed length. The function is operative to generate a unique real-time signature for each set of data received as an input to the function. Alternate embodiments may utilize other methods of generating a digital signature according to the application requirements. In one embodiment, for example, when a generally constant value is expected in the real-time data, a minimum and maximum value of the data may be stored. In another embodiment, peak values of certain frequency components may be stored. In still another embodiment, the real-time signature may capture a subset of the values from the entire set of sampled data 135 defining a particular pattern of data expected, for example, at periodic intervals in time.

At step 156, the anomaly detector module 150 next compares the real-time signature generated to a set of expected signatures. With reference also to FIG. 2, a table 200 in the memory 38 of the motor drive 30 may store the set of expected signatures. For each signature 204, an identifier 202 and a number of occurrences 206 may be associated with the corresponding signature 204. The identifier 202 and number of occurrences 206 will be discussed in more detail below. If the real-time signature matches one of the signatures 204 in the set of expected signatures 200, the number of occurrences 206 corresponding to the matched signature 204 is incremented, as shown by steps 158, 160. If the real-time signature does not match one of the signatures 204 of the set of expected signatures 200, the new real-time signature is assigned an identifier. The new signature, identifier, and an initial number of occurrences, set equal to one, may be stored in the table of expected occurrences 200, as shown in steps 158, 170, and 172. Thus, the controller 100 learns patterns of anomalies as they occur.

Determination of whether a real-time signature matches one of the signatures 204 in the set of expected signatures 200 may be performed, for example, may be performed by any desired pattern matching routine. The pattern matching routine may return, for example, a percentage likelihood that a real-time signature is a match of one of the set of expected signatures. Conversely, the pattern matching routine may return a value defining a level of deviation between the real-time signature and each signature in the set of expected signatures 204. A metric is established based on the selected pattern matching routine to determine whether each real-time signature corresponds to an existing signature stored in the set of expected signatures or is a new anomalous event that has been detected.

As also shown in step 174, the controller 100 may generate an indication that the anomaly occurred. It is contemplated that the nature of the indication may be configured according to the application requirements. When the anomaly is detected, it may be desirable to only post a message to a technician such that the anomaly may be inspected and resolved at a time that is convenient for the controlled process. Alternately, it may be desirable to shut down the controlled process to avoid damage to machinery or parts in the controlled process. The shutdown may be immediate or follow a controlled sequence. A message may be provided to the technician in tandem with the controlled shut down. Optionally, different actions may be taken as a function of the real-time signal being monitored.

As also indicated in step 162, it is contemplated that an optional anomaly check may be performed even if the real-time signature matches a signature 204 stored in the table of signatures 200. As previously indicated, the controller 100 stores each new real-time signature as it is generated. It is contemplated that the optional anomaly check may read the frequency of occurrence 206 for the matched signature. If a previously identified anomaly was stored in the table 200, the number of occurrences will be one. An infrequently occurring anomaly may be greater than one but may still be significantly less (e.g., an order of magnitude or greater) than an expected signature. Thus, the optional anomaly check may read the number of occurrences of the matched signature and determine whether the matched signature is, in fact, an anomaly rather than an expected signature. According to another embodiment of the invention, new real-time signatures, corresponding to an identified anomaly, may be stored in a separate table from the expected anomalies. A technician may first inspect the controlled process and determine whether a new real-time signature identified by the anomaly detector module 150 corresponds to desired, but previously unperformed, operation of the controlled process or whether the new signature was undesired operation. If the new real-time signature was anomalous, undesired operation, it may be deleted from the temporary table. If, however, the new real-time signature corresponds to desired operation which had not previously been observed in the controlled process, the new real-time signature may be added to the expected signatures table 200.

It is also contemplated that the control system may include an initial training mode of operation. In the initial training mode, the anomaly detector temporarily suspends taking action at step 174 when a new real-time signature is identified. Rather, the controller 100 simply monitors each of the real-time signatures generated and either increments the number of occurrences if it is already present in the expected signatures table 200 or it adds the new real-time signature to the table 200, assigning the new signature an identifier and setting the initial occurrence to one. This training mode may be used to populate the expected signature table 200 with signatures the controller 100 will observe during normal operation of the controlled system. It is also contemplated that multiple sets of expected signatures may be generated. Either a single table may include, for example, an additional parameter defining a particular operating condition or separate tables may be generated, where each table corresponds to a particular operation condition. For example, if a controlled system or process uses multiple recipes, as discussed above, each recipe may be executed during the training mode and a separate set of expected signatures may be stored for each recipe.

To further explain the method of detecting the real-time anomaly, a pair of examples will be presented.

The training mode may further be used to identify a particular signal by which an anomaly is to be detected. During the training mode, an undesired event that may be anticipated to occur during normal operation may be intentionally introduced or simulated within the system. During occurrence of this event, the real-time signals 112 may be monitored and signatures generated from each of the real-time signatures. A comparison of the real-time signatures may determine which real-time signal 112 generated the most distinctive signature or, in other words, which real-time signature generated as a result of the anomaly varied the greatest from its normal signature. The value of the control signal 116 may be set such that the real-time signal 112 corresponding to the most distinctive real-time signature is monitored once training mode is complete.

In a first application, it may be desirable to utilize the anomaly detection system to provide protection to the controlled machine or process. In such an application, the anomaly detector module 150 may be configured to bring the motor drive 30 to an immediate stop when an anomaly is detected. The controlled system is operated in a learning mode through each of the operations the motor 50 connected to the motor drive 30 is expected to perform such that the motor drive 30 stores a set of expected signatures 200 corresponding to normal operation. In one application, the motor drive 30 may be driving a conveyor system. An initial acceleration to bring the system up to speed may require a substantial level of current and/or torque. Once the conveyor is operating at a desired speed, the motor drive 30 may be able to maintain a constant speed at a lower level of current and/or torque. Thus, a typical shear pin or overload clutch must be configured to allow for acceleration and are unsuited to detect a temporary change in current during operation at rated speed that remains below this higher level of current required to accelerate up to speed. The condition monitor module 110 may be configured to monitor a current feedback signal, a current reference signal, a torque feedback signal, a torque reference signal, or the like within the motor drive 30.

The anomaly detector module 150 is able to monitor operation of the controlled system and detect a real-time anomaly. For example, the belt on the conveyor, a gear in a gear box, a drive pulley, or the like in the drivetrain between the motor 50 and the conveyor may experience unusual wear resulting in a periodic spike in current when the damaged surface is being engaged within the drivetrain. The periodic spike may occur once per revolution of the motor 50, at multiple instances per revolution of the motor 50, once per revolution of the conveyor belt or the like. The anomaly detector module 150 may be configured to monitor the frequency response of the sampled data set 135. The frequency response of the sampled data set will exhibit an abnormal frequency, corresponding to the periodic engagement of the damaged area in the drive train, and the anomaly detector module 150 may set a message to the operator identifying the presence of the anomaly even though a maximum output current for the motor drive 30 has not been exceeded.

Alternately, the anomaly detector module 150 may be configured to monitor a time series of data for the current or torque output by the motor 50. A time series may better capture a single occurrence of a failure rather than a periodic repetition as previously described. For example, a number of parts may be loaded on to the conveyor at predefined intervals. The potential exists for a part to fall over. The part that has fallen may cause a jam, or partial jam along the conveyor, resulting in a temporary spike in the current output by the motor drive 30. Although a total jam may trip an overload in the motor drive 30, a temporary spike in current may be sufficient to dislodge the fallen part, although causing some damage to the part and/or the controlled system. Again, the temporary spike may not exceed that current required for acceleration and the standard mechanical devices may be unable to detect the anomaly. The condition monitor module 110 and the anomaly detector 150, however, identify the different signature or pattern resulting from the temporary spike in current and provide an indication to the operator that an anomaly occurred. Optionally, the motor drive 30 may bring the portion of the controlled system to a stop to permit inspection of that portion of the controlled system for removal of a damaged part and/or repair of the conveyor, if necessary.

In a second application, it may be desirable to utilize the anomaly detection system to provide a measure of quality control over parts being assembled or manufactured on the controlled machine or process. A typical application may be, for example, a labelling machine or a bottle-capping machine. Product passes through the controlled system at a high rate of speed. At periodic intervals, the controlled system engages the product to affix a label, screw on a cap, or the like. During normal operation, each interaction with the product by the actuator produces an expected signature. The expected signatures are stored in the table 200 and compared against real-time signatures to verify the controlled process is interacting as desired with the product passing down the line.

The duration of the time window 132 may be set to coincide with the period of time in which an actuator, such as the motor 50 controlled by the motor drive 30, operates to engage the product. The motor drive 30 may also receive an input signal from the industrial controller 10 indicating when the actuation is to occur. The condition monitor 110 may be configured to only monitor operation of the motor drive 30 during the period in which the label is being applied or in which the bottle top is being tightened. A particular pattern or signature corresponds to correct application of a label or bottle top. If, however, the product is improperly aligned, a label fails to adhere, the threads in the bottle top are out of tolerance, or the like, the process may result in a product that is not properly labelled, not properly sealed, or otherwise outside of a desired set of quality standards. When the real-time pattern is detected, the anomaly detector module 150 may be configured to set an output signal from the motor drive 30 back to the industrial controller 10 identifying a product out of tolerance. The industrial controller 10 may, in turn, be configured to shunt the product to a side track, where it may be inspected and/or removed from production. Thus, the anomaly detection system may aid in quality control of products being manufactured by the controlled machine or process.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method of real-time anomaly detection in a motor drive, the method comprising the steps of:
   sampling at least one real-time signal in a motor drive at a periodic interval, wherein the real-time signal corresponds to operation of an industrial control system in which the motor drive is operating;
   storing a predefined number of samples of the at least one real-time signal in a memory of the motor drive;
   generating a real-time signature of the predefined number of samples with the motor drive;
   comparing the real-time signature to a set of expected signatures; and
   setting an indicator of a real-time anomaly within the motor drive when the real-time signature does not correspond to one of the expected signatures in the set of expected signatures.

2. The method of claim 1 wherein setting the indicator further includes at least one of the following:
   transmitting a message to an external controller indicating the occurrence of the real-time anomaly, and
   bringing a motor connected to the motor drive to a stop responsive to detecting the anomaly.

3. The method of claim 1 further comprising initial steps of:
   operating the industrial control system in a learning mode;
   executing the steps of (1) sampling the at least one real-time signal in the motor drive at the periodic interval, (2) storing the predefined number of samples of the at least one real-time signal in the memory of the motor drive, and (3) generating the real-time signature of the predefined number of samples while the industrial control system is in the learning mode; and
   storing each real-time signature generated while the industrial control system is in the learning mode to create the set of expected signatures.

4. The method of claim 1 wherein:
   the industrial control system is operable in at least a first operating mode and a second operating mode,
   a first set of expected signatures is stored in the memory of the motor drive for the first operating mode,
   a second set of expected signatures is stored in the memory of the motor drive for the second operating mode, and
   the real-time signature is compared to either the first set of expected signatures or the second set of expected signatures when the industrial control system is operating in the first operating mode or the second operating mode, respectively.

5. The method of claim 1 further comprising the step of determining a frequency response of the predefined number of samples of the at least one real-time signal stored in the memory, wherein the real-time signature is generated from the frequency response.

6. The method of claim 1 wherein each of the expected signatures has an identifier associated with the expected signature and wherein when the real-time signature does not correspond to one of the expected signatures in the set of expected signatures, the method further comprises the steps of:
assigning a new identifier to the real-time signature; and
adding the real-time signature and the new identifier to the set of expected signatures.

7. The method of claim 1 wherein the set of expected signatures includes a number of occurrences corresponding to each expected signature stored in the memory of the motor drive and the method further comprises the step of incrementing the number of occurrences when the real-time signature corresponds to one of the expected signatures.

8. The method of claim 1 further comprising the step of compensating the predefined number of samples for an operating condition of the industrial control system which varies over time prior to generating the real-time signature.

9. A system for real-time anomaly detection by a motor drive configured to operate in an industrial control system, the system comprising:
a memory configured to store a set of expected signatures and a series of instructions; and
a controller configured to execute the series of instructions to:
obtain at least one real-time signal corresponding to operation of the industrial control system,
sample the at least one real-time signal at a periodic interval,
storing a predefined number of samples of the at least one real-time signal in the memory,
generating a real-time signature of the predefined number of samples,
comparing the real-time signature to a set of expected signatures, and
setting an indicator of a real-time anomaly when the real-time signature does not correspond to one of the expected signatures.

10. The system of claim 9 wherein setting the indicator further includes at least one of the following:
transmitting a message to an external controller indicating the occurrence of the real-time anomaly, and
bringing a motor connected to the motor drive to a stop responsive to detecting the anomaly.

11. The system of claim 9 wherein the controller is further configured to operate in a learning mode and while in the learning mode, the controller (1) receives the at least one real-time signal, (2) samples the at least one real-time signal at the periodic interval, (3) stores the predefined number of samples of the at least one real-time signal in the memory, and (4) generates the real-time signature of the predefined number of samples and is further operative to store each real-time signature generated while the industrial control system is in the learning mode to create the set of expected signatures.

12. The system of claim 9 wherein:
the controller is operable in at least a first operating mode and a second operating mode,
the memory is configured to store a first set of expected signatures for the first operating mode and a second set of expected signatures for the second operating mode, and
the real-time signature is compared to either the first set of expected signatures or the second set of expected signatures when the controller is operating in the first operating mode or the second operating mode, respectively.

13. The system of claim 9 wherein the controller is further configured to determine a frequency response of the predefined number of samples of the at least one real-time signal stored in the memory, wherein the real-time signature is generated from the frequency response.

14. The system of claim 9 wherein each of the expected signatures has an identifier associated with the expected signature and wherein when the real-time signature does not correspond to one of the expected signatures in the set of expected signatures, the controller is further configured to:
assign a new identifier to the real-time signature; and
add the real-time signature and the new identifier to the set of expected signatures.

15. The system of claim 9 wherein the set of expected signatures includes a number of occurrences corresponding to each expected signature stored in the memory and the controller is further configured to increment the number of occurrences when the real-time signature corresponds to one of the expected signatures.

16. The system of claim 9 wherein the controller is further configured to compensate the predefined number of samples for an operating condition of the industrial control system which varies over time prior to generating the real-time signature.

17. A method for detecting an anomaly in real-time for an industrial control system, the method comprising the steps of:
sampling a real-time signal corresponding to operation of the industrial control system, wherein the sampling is performed at a periodic interval by a motor drive in the industrial control system;
defining a duration of a moving window for a plurality of the periodic intervals;
storing a plurality of values of the real-time signal sampled at the periodic interval in a memory of the motor drive for the duration of the moving window;
determining a real-time pattern from the plurality of values of the real-time signal stored in the memory;
comparing the real-time pattern to a set of expected patterns stored in the memory; and
setting an indicator of a real-time anomaly within the motor drive when the real-time pattern does not correspond to one of the expected patterns in the set of expected patterns.

18. The method of claim 17 further comprising the initial steps of:
operating the industrial control system in a learning mode;
executing the steps of (1) sampling the real-time signal at the periodic interval, (2) storing the plurality of values of the real-time signal in the memory, and (3) determining the real-time pattern while the industrial control system is in the learning mode; and
storing each real-time pattern generated while the industrial control system is in the learning mode to create the set of expected patterns.

19. The method of claim 17 further comprising the step of determining a frequency response of the plurality of values of the real-time signal, wherein the real-time pattern is generated from the frequency response.

20. The method of claim 17 wherein:
the industrial control system is operable in at least a first operating mode and a second operating mode,
a first set of expected patterns is stored in the memory of the motor drive for the first operating mode,
a second set of expected patterns is stored in the memory of the motor drive for the second operating mode, and
the real-time pattern is compared to either the first set of expected patterns or the second set of expected patterns when the industrial control system is operating in the first operating mode or the second operating mode, respectively.

* * * * *